United States Patent
Koo et al.

(10) Patent No.: US 6,874,085 B1
(45) Date of Patent: Mar. 29, 2005

(54) MEDICAL RECORDS DATA SECURITY SYSTEM

(75) Inventors: Charles C. Koo, Palo Alto, CA (US); Yuh-Ming Shyy, San Jose, CA (US)

(73) Assignee: iMedica Corp., Mountain View, CA (US)

( * ) Notice: Subject to any disclaimer, the term of this patent is extended or adjusted under 35 U.S.C. 154(b) by 0 days.

(21) Appl. No.: 09/571,076

(22) Filed: May 15, 2000

(51) Int. Cl.[7] ............................................. H04L 9/00
(52) U.S. Cl. ..................................... 713/165; 713/182
(58) Field of Search ................................ 713/165, 182

(56) References Cited

U.S. PATENT DOCUMENTS 5,956,400 A * 9/1999 Chaum et al. ............... 713/167
6,360,324 B2 * 3/2002 Van Blarkom ............... 713/182

FOREIGN PATENT DOCUMENTS

EP  884670 A1 * 12/1998 ............. G06F/1/00

* cited by examiner

Primary Examiner—Gregory Morse
Assistant Examiner—Jacob Lipman
(74) Attorney, Agent, or Firm—Squire, Sanders & Dempsey, L.L.P.

(57) ABSTRACT

A medical record is partitioned into personal and medical data portions, and an identification code is concatenated into each portion. The personal data portion is encrypted so a patient's identity cannot be linked to the patient's medical data except by authorized viewers. Each portion of the secure medical record can be transferred over a network as separate files, and stored in a data storage system separately. Access to the entire medical record is thereby provided only to those who know the key for the personal data portion of the medical record. The system and method can be used to help ensure patient confidentiality while allowing patient medical records to be accessed over a network such as the Internet, providing physicians and patients quick access to their medical records. The system and method can be used to create a database of anonymous medical records useful for medical research.

7 Claims, 8 Drawing Sheets

MEDICAL RECORDS DATA SECURITY SYSTEM

BACKGROUND OF THE INVENTION

Field of the Invention

The disclosure relates to securing electronic versions of patient medical records for transfer through networks and for storage in databases.

BACKGROUND

The present inventors have determined that the field of medicine, and in particular patient care, could benefit greatly from the speed and easy access to information provided by the Internet. If physicians were able to remotely access patient records via the Internet, patient care could be accelerated and made more thorough. For instance, in an off-hours situation, a physician could access a patient's medical history from home without the need to travel to the clinic to view the patient's medical record, thus saving what may be critical time in a medical emergency. Or, for instance, a specialist in another city could be consulted in a case immediately, without the need to wait for the copy and transfer of the relevant medical records to the consulting physician, e.g., by facsimile as is done now.

Storing medical records in an electronic, remote-access medical records database system could also have many advantages. As the population becomes increasingly mobile, such a system would make it easier for patients to change physicians, or be treated by different physicians at different clinics, while still providing all necessary information to each physician. As the health-care system is under increasing pressure to save costs, an electronic medical records system could save money by reducing expenses related to duplicating, filing, and forwarding medical records using the traditional paper methods. The cost pressure on the health-care system is also forcing patients to become their own health-care advocates, and to be more involved in managing their own treatment. A centralized, remote-access medical records database system could allow patients access to their own medical records, so that they can stay informed as to their medical treatment. Finally, a database of electronic medical records would allow unprecedented opportunities for "data mining". For instance, statistical evaluation of drugs prescribed and disease outcomes for patients of a particular age group could easily be studied. Medical research could benefit greatly from such an opportunity.

However, patient medical records are highly sensitive documents, and it is crucial to maintain the confidentiality of the records and allow only qualified people access to them. Physicians and hospitals are subject to sanctions for any violations of patient-physician confidentiality. If the database is to be used for "data mining", the identity of the patients in the database must be protected from researchers seeking information. Even the system administrator of the database should be prevented from accessing the medical records stored in the database. If individual patients are allowed access to the database, they must have access to only their own medical record.

There are two aspects to maintaining security of information: security during the transfer of the information and security during the storage of the information. The security of the electronic medical records must be maintained both while the record is transmitted over any network and while the record is stored in a database.

Encrypting data for transfer over the Internet is a well-known feature of Internet browsers, such as Netscape's Navigator and Microsoft's Explorer, and also of e-mail. The SSL 128-bit encryption, for instance, is considered the industry standard, and is highly secure. Although these encryption schemes protect data during transmission, they do not protect data during storage once the transmission is complete, leaving a medical record unsecured once received after transfer.

A number of algorithms and other methods (protocols) are also available to encrypt data for storage and for other purposes. These include both symmetric key methods, such as the Data Encryption Standard (DES), in which the same key is used to encrypt and decrypt the data, and public key methods, such as the well-known RSA algorithm, in which different keys are used for encryption and decryption. However, these methods, which are typically enabled in software for personal computer applications, can take a long time to encrypt and decrypt files. Due to the large size of a medical record, using these algorithms to secure such a file for storage and transfer can be very slow. The record will take a long time to fully encrypt before sending, and the encrypted file may also take a long time to store in a database once it is received. When the 30 file is accessed, decrypting the large file will also be slow.

Therefore, a computer related method is needed for storing and transferring patient medical records. The method must ensure maximum security, e.g., only qualified people should be able to access authorized medical records. At the same time, the method must be fast enough (when performed using conventional personal computers) so that it does not obviate the speed advantage of the Internet when the medical records are remotely accessed.

SUMMARY

A method and system are provided for the secure transmission and storage of patient medical records. An identification code is provided for each medical record. Each medical record is partitioned into a personal data portion and a medical data portion. The identification code is concatenated onto each portion. The personal data portion is then encrypted to a greater extent than the medical data portion. In one embodiment, the medical data portion is not encrypted and is in plain text. Encrypting the personal data portion secures the identity of the patient.

The personal data portion can be encrypted with a key, for instance, by using symmetric key encryption, so that only those with knowledge of the decryption key can decrypt the encrypted personal data portion. The encrypted personal data portion can be further encrypted to create a doubly encrypted personal data portion. For example, asymmetric public key encryption can be used to further encrypt the encrypted personal data portion. In this instance, only those with knowledge of the private decryption key corresponding to the public encryption key and also with knowledge of the symmetric decryption key can decrypt the doubly encrypted personal data portion.

The encrypted personal data portion and associated medical data portion can be stored as separate files and in separate databases in a computer data storage system. Each portion can also be transmitted as separate files through a network, e.g. the Internet, to be stored in a remote computer data storage system. For transmission through a network each portion can be further encrypted during the transmission, for instance with SSL 128-bit encryption. This creates a doubly (or triply) encrypted personal data portion during such transmission.

Only the medical record—the personal data portion and the medical data portion—are transmitted to and stored in the remote computer data storage system. The decryption key is not stored in the remote computer data storage system, so that access to the remote computer data storage system alone does not provide access to the medical records. In some cases, however, if the personal data portion is doubly encrypted, one of the decryption keys may be stored in the remote computer system.

To access a secured medical record, the encrypted personal data portion is decrypted. The identification code in the decrypted personal data portion is matched to the identification code in the medical data portion to recreate the original plain text record.

To access and view a secure medical record stored in a remote computer data storage system, a user starts a session, typically by using an Internet browser, by connecting conventionally with a server computer connected to the remote computer data storage system. The user submits the decryption key to the server. A program running on the remote computer data storage system uses the decryption key to produce the desired medical record, as described above. The user can view the medical record using the browser. Once the user ends the session with the server, the decryption key and plain text medical record are erased from the computer memory and there is no permanent record of either in the remote computer data storage system.

A user can provide a second user access to a patient's medical record by providing the second user with the decryption key for that patient's medical record. The second user can view the medical record by submitting the key to the data storage system as just described. In another embodiment, a user provides a second user with a user_id and a special key. The remote computer data storage system is also provided by the first user with a file which contains the user_id, encrypted special key, encrypted clinic-specified key, and encrypted patient_id, where the special key, clinic-specified key and encrypted patient_id are all encrypted using the special key. To view the medical record for the patient whose patient_id is specified in the file, the second user submits the user_id and special key to the remote computer data storage system. A computer program executed on the remote computer data storage system then uses the user_id and special key to identify and decrypt the medical record for the second user.

DETAILED DESCRIPTION

Figure 1:
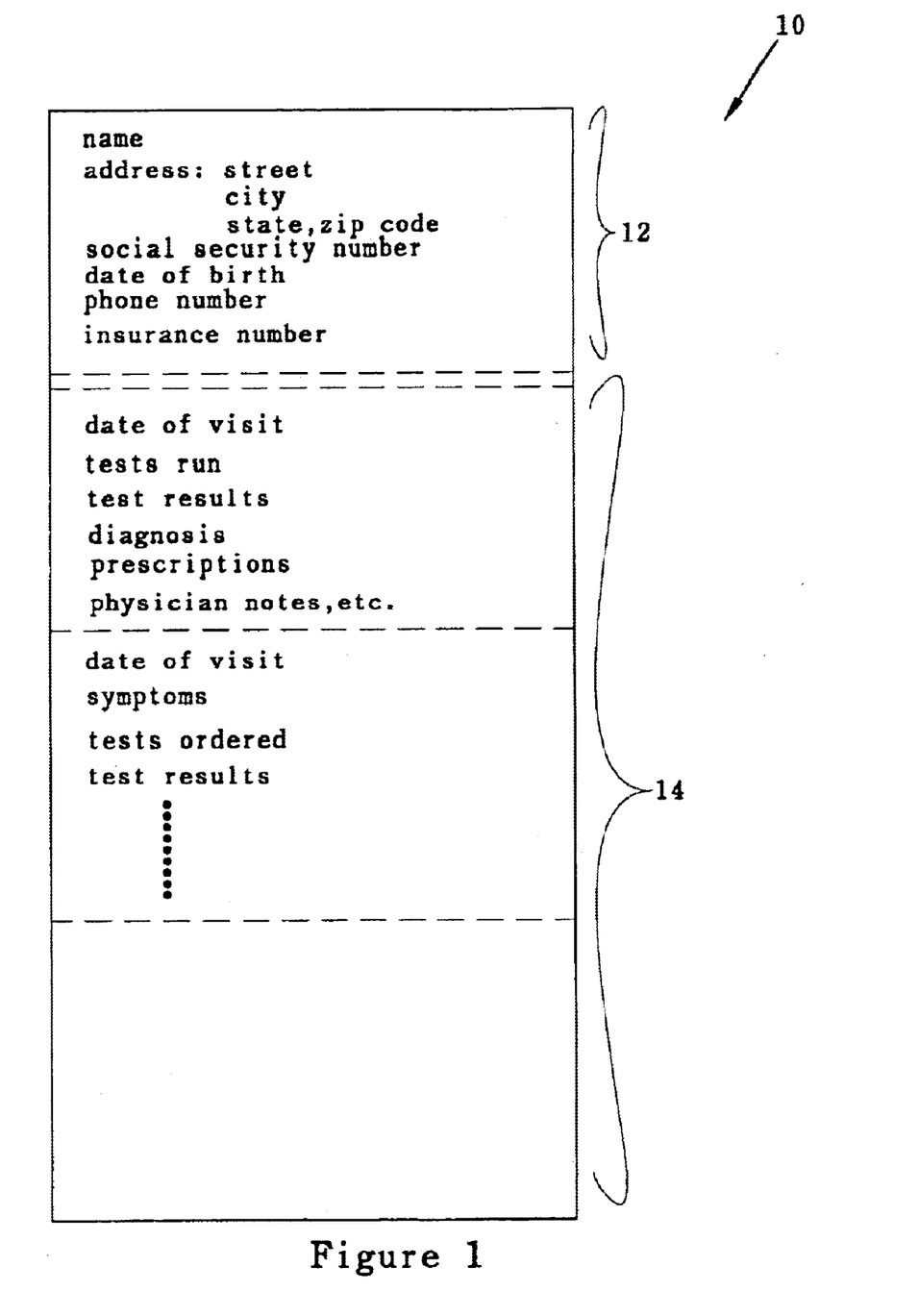
FIG. 1 shows an example of the data structure of a computerized medical record.

FIG. 1 shows a typical patient medical record 10 (shown in summarized form for purposes of illustration). As originally written, e.g. by a doctor, record 10 is an unencrypted (plain text) computer file, e.g., a Microsoft Word file or other type of conventional text/graphics file. A computerized (electronic) medical record can be created from a physician or his or her assistant's handwritten notes by conventionally typing the information into a computer using a keyboard. Alternatively, an electronic version of the medical record can be generated originally without handwritten notes by using instead a software based electronic medical charting system. An example of such a system would be a hand-held computer equipped with an electronic charting program that lets the physician or assistant choose from a menu of selections in fields for the test results, diagnoses, prescriptions, etc.

Medical record 10 consist of two types of data. Data 12 relating to the personal identity of the patient includes, e.g., the patient's name, address, social security number, insurance numbers, date of birth, and other information used to identify the patient. Data 14 relating to the patient's medical history includes, e.g., name of physician, date of office visit, tests run and test results, diagnoses, prescriptions, and other information relating to the medical condition of the patient. While the patient's personal data 12 is relatively compact in size and remains of fairly constant size, the patient's medical data 14 is much larger and generally expanding with each medical service rendered.

Figure 2:
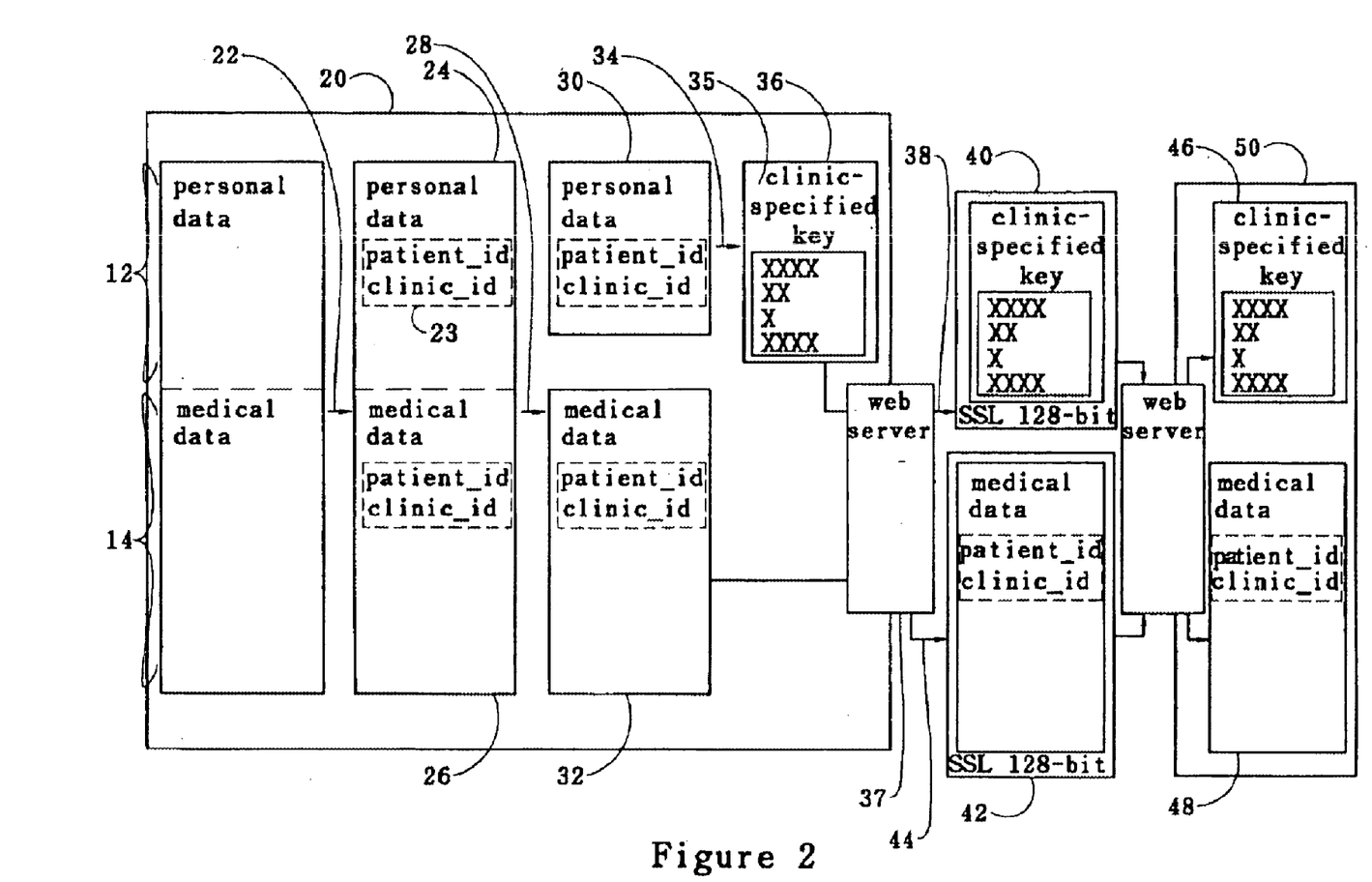
FIG. 2 illustrates graphically the secure transmission and storage of a medical record.

FIG. 2 illustrates how, in one embodiment, a conventional patient medical record 10 is converted to a secure medical record, 36 and 32, using a computer program running on, for instance, a clinic computer system 20. As used herein, the term "clinic" refers to any physician office, hospital, or medical facility where patients are examined by and/or seek treatment from physicians or other health-care providers. The medical record 10 is assigned by the computer program an identification code 23, which is concatenated at 22 with both the personal data portion of the record 12 and the medical data portion of the record 14, resulting in modified portions respectively 24 and 26. In this example the identification code 23 consists of a clinic identification code and a patient identification code, which, concatenated together make up the identification code for this particular patient's medical record. The medical record is partitioned at 28 into two separate files, respectively 30 and 32, corresponding to portions 24 and 26 exactly. Each file 30 and 32 thereby contains the identification code 23.

The personal data file 30 is conventionally encrypted at 34 using a clinic specified encryption key 35 to encrypt the data. A number of encryption algorithms, typically symmetric private key encryption algorithms, can be used to do the encryption. In one embodiment, each letter of the personal data portion is converted to a number value, for instance "X Y Z", of the personal data portion is converted to "96 97 98". The numbers corresponding to each letter are stored in a tables in the clinic computer system and the remote computer system. A numerical key (the clinic-specified key) is chosen, for instance "12 13 14", and the key is added to the numerical personal data portion, (96+12)(97+13)(98+14), to get the encrypted personal data portion, "108 110 114". To decrypt the personal data portion the process is simply reversed, the key is subtracted from the encrypted personal data portion and the numbers are converted to text. The method of this example is most secure when the numerical key chosen is of similar length to the personal data portion, which is feasible because the personal data portion is relatively short.

An important aspect of the encryption is the clinic-specified key, which is chosen by, and typically known only to, the clinic encrypting the medical record. Without knowledge of this key, the personal data portion cannot be decrypted. In general, any encryption scheme that allows only those with knowledge of the clinic-specified key to be able to decrypt the personal data portion can be used to encrypt the personal data portion of the medical record. As is explained in more detail below, using such an encryption scheme ensures the security of the records while stored in a computer data storage system or transmitted through a network.

In this embodiment the medical data portion is not encrypted. Encrypting only the personal data portion provides a performance advantage over encrypting the entire record as the patient data portion file is typically a much smaller than the medical data portion file and, therefore, takes much less time to encrypt (software encryption is a relatively slow process). Leaving the medical data portion unencrypted does not compromise security because the medical data alone, without connection to a particular patient, is not considered to be confidential information. Note that this method differs from usual cryptographic practice where the body of the file to be secured (e.g. corresponding to the medical data portion) is encrypted and message identification information (e.g. corresponding to the patient data portion) is often left in plain text.

In other embodiments, the medical data portion may also be encrypted, typically using a less secure but faster encryption method than is used to encrypt the personal data portion, so that the performance advantage is maintained.

In one embodiment, the encrypted personal data portion 36 and medical data portion 32 are stored locally in the data storage of the clinic computer system, 20, in, for instance, a conventional relational database structure. In another embodiment, the encrypted personal data portion 36 and the medical data portion 32 are stored in a remote computer system 50.

The encrypted personal data portion 36 can be transferred at 38 from the clinic computer 20 over a non-secure data network, such as the Internet, for storage in a remote computer system 50. The clinic computer system, 20, needs therefore to include software and hardware, for example web server 37, necessary to interact with the network (as would be known by one of skill in the art). A standard encryption scheme, such as 128-bit secure socket layer (SSL 128-bit) can be used during transmission to double encrypt the personal data portion 40 to ensure security for transmission. The SSL 128-bit protocol was developed by Netscape and is known to those of skill in the art.

The medical data portion 32 is also transferred at 44 from the clinic computer 20 over a data network to the remote computer system 50. Although the medical data portion is typically not encrypted for storage, it may be encrypted using SSL 128-bit, or some other Internet security protocol for transmission. Because the medical data portion of the medical record contains no information on the personal identity of the patient, even if the transmission of the medical data portion were intercepted and decrypted, the information could not be linked to the patient. If, during transmission, the patient personal data were intercepted, it could not be fully decrypted without knowledge of the clinic-specified key.

Figure 3:
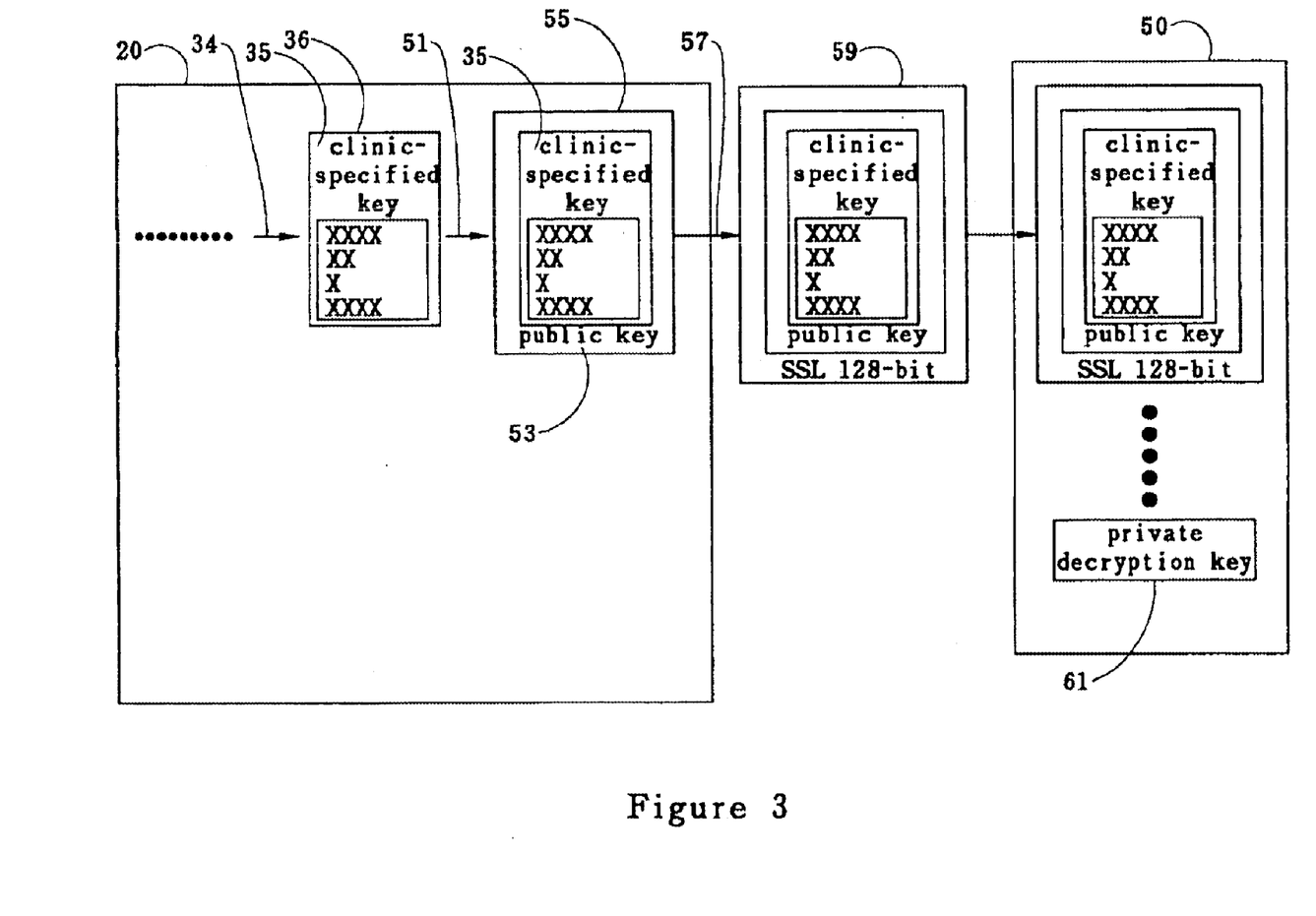
FIG. 3 illustrates graphically another embodiment of the secure transmission and storage of a medical record.

In other embodiments, the encrypted personal data portion can be further encrypted, to add additional levels of security. FIG. 3 illustrates an example of an additional level of security added to the personal data portion using public key (also known as an asymmetric key) encryption, such as the RSA algorithm, which is well known to those of skill in the art (see U.S. Pat. No. 4,405,829). In this example, the administrator of the remote computer system 50 provides the clinic with the public encryption key 53, while the corresponding private decryption key 61 is known only by the remote computer system. The clinic encrypts the personal data portion with the clinic-specified key and corresponding algorithm at 34, as was illustrated in FIG. 2. The clinic then uses the public encryption key 53 to doubly encrypt the personal data portion at 51 using the public key algorithm provided by the remote computer system 50. The doubly encrypted personal data portion 55 can be transmitted at 57 to the remote computer system. Again, the SSL 128-bit protocol can be used to now triply encrypt the personal data portion for transmission 59. The doubly encrypted personal data portion of this example can only be decrypted with knowledge of the private decryption key 61, known only to the remote computer data storage system, and the clinic-specified key 35.

The remote computer system 50 can be, for instance, a centralized storage facility used to store records from many clinics or a computer system at another clinic, which uses the present method to securely transfer and store records for patients moving to or being seen by a physician at the other clinic.

The encrypted patient personal data files 46 can be stored separately in different databases from the medical data files 48. Separate storage can further ensure the security of the medical records. Because the personal data files 46 are still encrypted while stored, an unauthorized user of the computer system cannot access the information without knowledge of both the encryption algorithm used and the clinic-specified key.

An important aspect of the method is that the remote computer system does not store the clinic-specified key used to encrypt the personal data portion. The clinic-specified key is known only to the clinic (or individual) that encrypted the personal data portion, and to those the clinic provides the key to. Therefore, even the administrator of the remote computer system cannot gain access to the information in the patient personal data files, because the administrator does not have the clinic-specified key.

The patient medical records are also protected because the only link between the patient medical data and patient personal data is the identification code, in this instance the clinic_id and patient_id. The identification code and the patient's identity are encrypted in the patient personal data, and thus not accessible.

To update a patient's medical record in the computer data storage system, the plain text medical record is updated at the clinic. The updated record is then encrypted anew using the above-described method, and can be transmitted to the computer data storage system, where the old record is overwritten by the new record. One of the advantages of the speed provided by the present method is that updating the medical records can be accomplished quickly.

Figure 4:
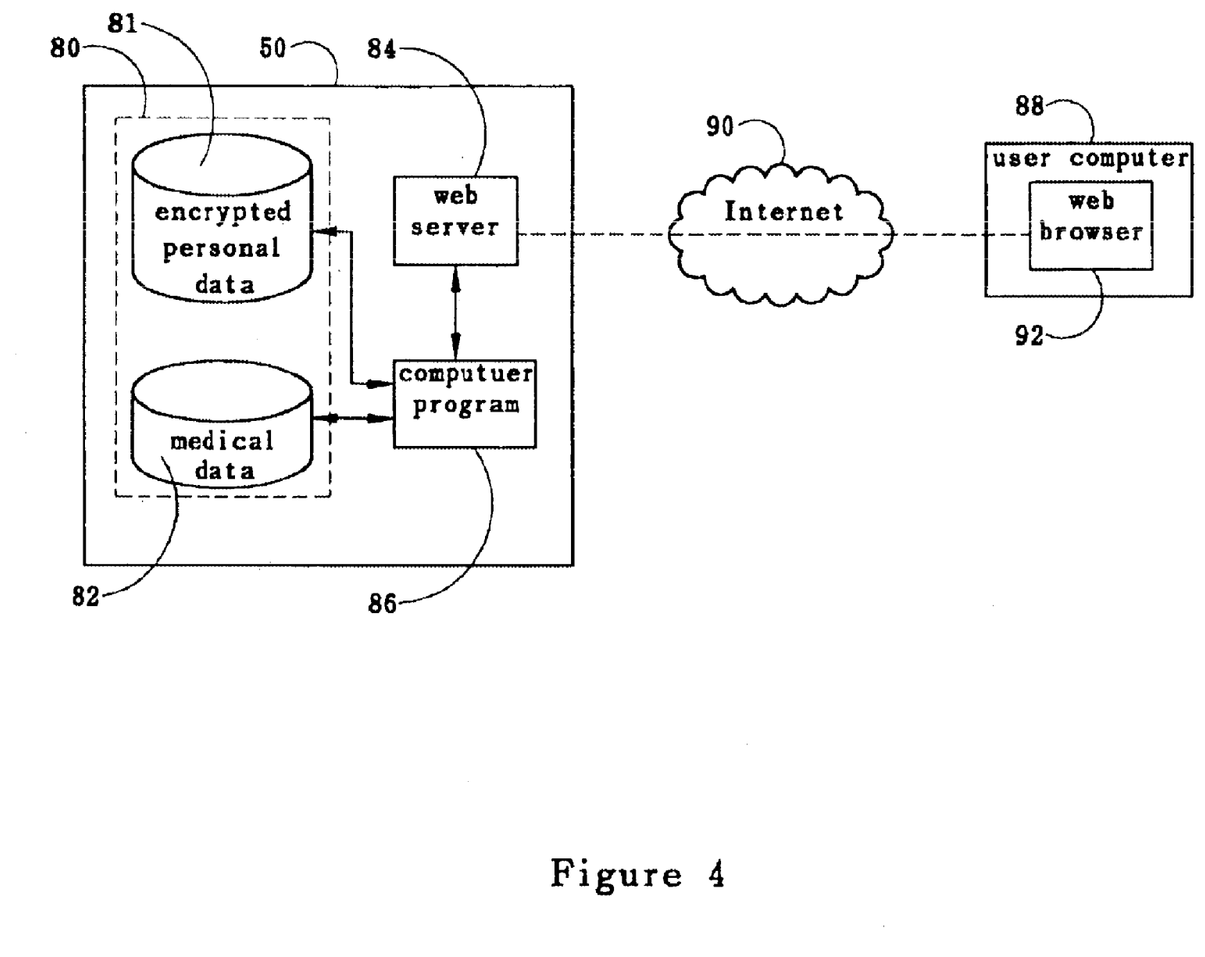
FIG. 4 is a block diagram of the computer system that is used for storage, transfer, and accessing the secure medical record.

FIG. 4 shows a block diagram of the computer system 50. As describe above the to personal data portion and the medical data portion are stored separately in a data storage system 80, for instance in separate tables in databases 81 and 82. The computer system 50 includes components used for providing access to the medical records, for instance server computer and software 84, as would be known by one of skill in the art. The system 50 also includes computer programs 86 used to decrypt and assemble a medical record from the databases 81 and 82. A user typically connects to system 50 by using any computer 88 suitable for accessing the Internet 90 and which is equipped with a browser 92.

Figure 5:
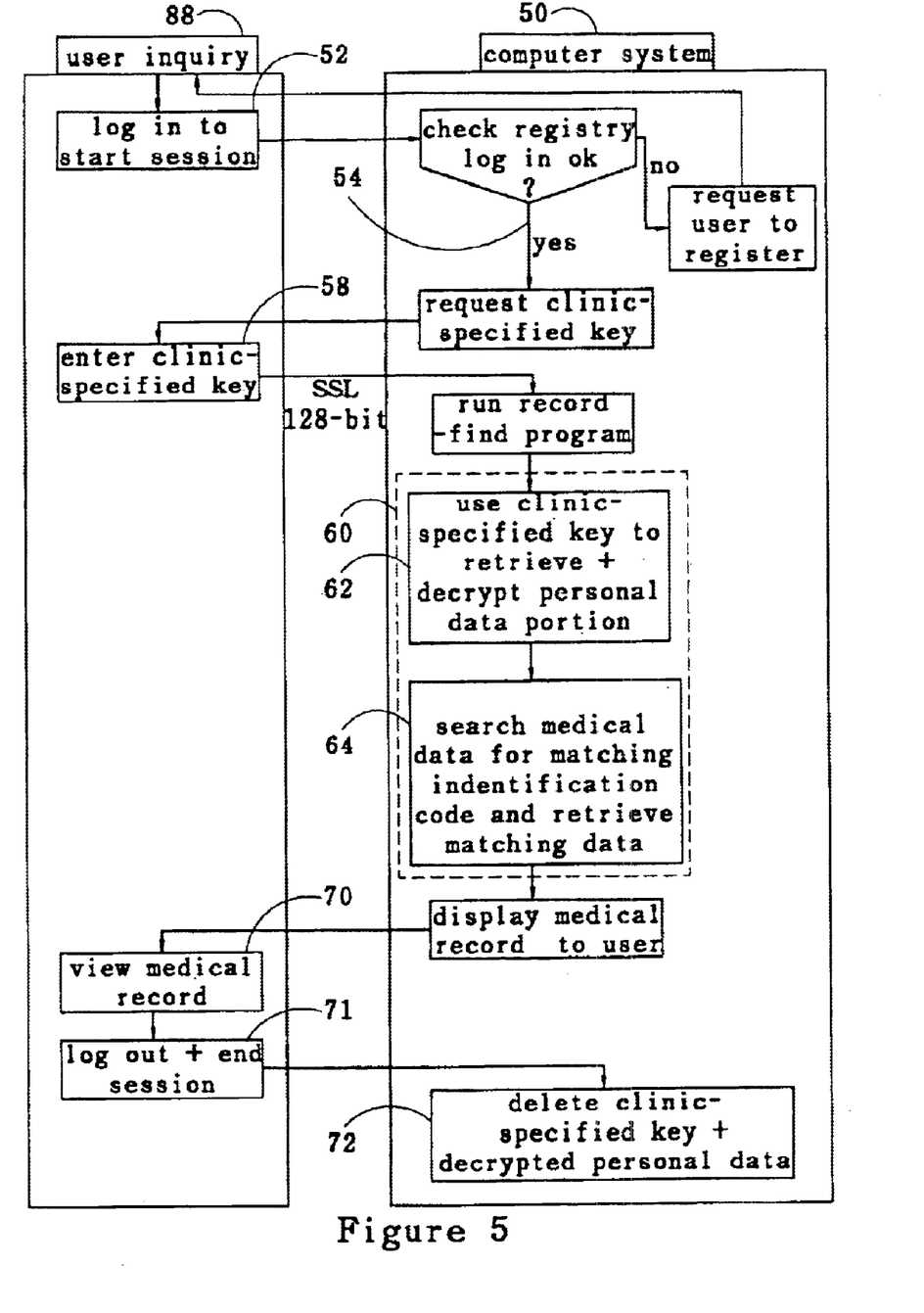
FIG. 5 illustrates graphically how the secure medical record is accessed.

To access the medical record, FIG. 5, the user starts an Internet (or intranet) session with the server connected to the computer system storing the medical records, typically by using an Internet web browser, such as Netscape's Navigator or Communicator or Microsoft's Explorer. The user must log into the server 52 and prove their identity through conventional means, e.g., a login password. Each physician or other user that wants access to the stored medical records must be registered with the server, which can be accomplished through a conventional online form provided by the server. The user's credentials and clinic affiliations are verified before the user is issued a login password for login purposes.

If the login is accepted 54, the user submits the key to the server 58, typically by a secure transmission. A program 60 then uses the key to decrypt the patient personal data 62. If an additional security level, such as that illustrated in FIG. 3, was used, the personal data portion must first be decrypted using the private decryption key 61. The identification code in the patient personal data is used to link the personal data to the patient's medical data 64. The user can then view 70 the plain text medical record via the Internet browser, typically by secure transmission, e.g. using SSL-128 bit encryption. The computer system 50 does not store or save the submitted key or decrypted personal data, as they are used only transiently during the web browser session to create a plain text version of the medical record. Once the user ends the session 71, the plain text medical record is erased 72.

Figure 6A:
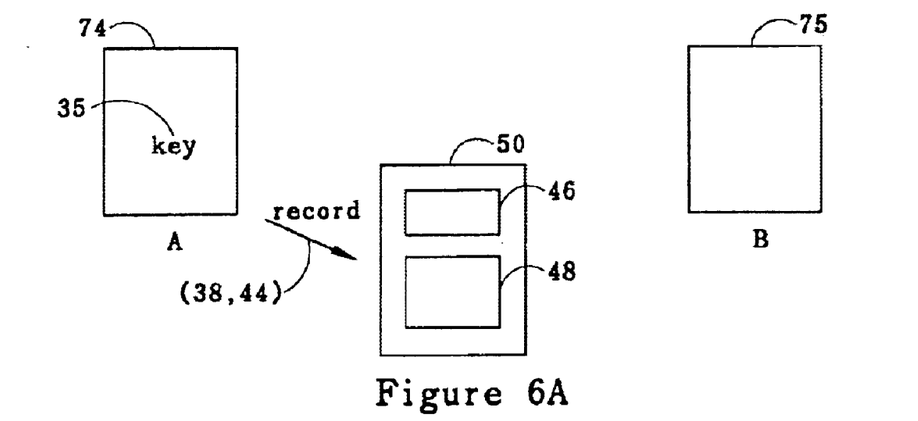
FIGS. 6A, 6B, and 6C illustrate graphically how access to the secure medical record is 30 provided to additional users.
Figure 6B:
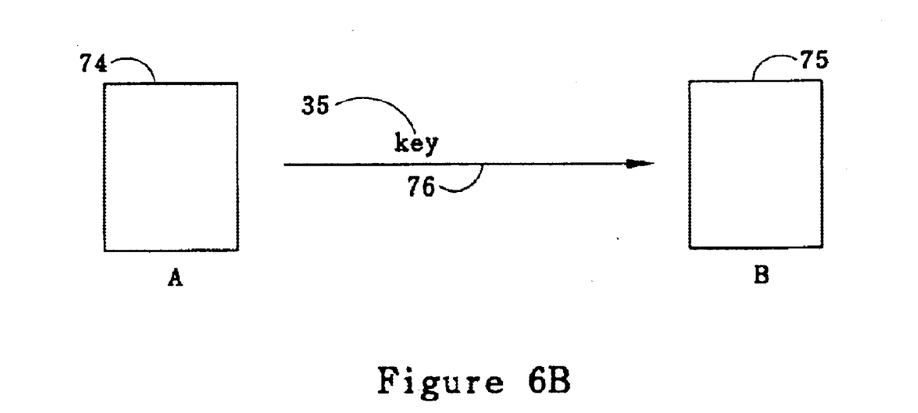
Figure 6C:
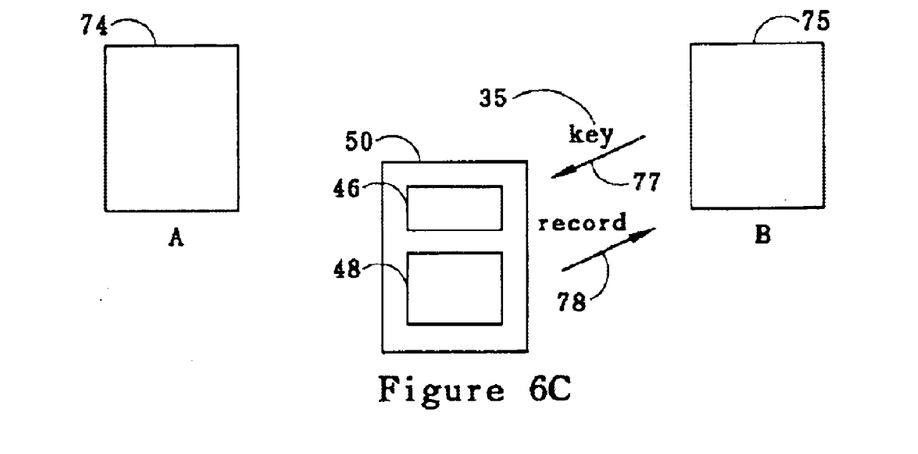

FIGS. 6A, 6B, and 6C illustrate how a second physician is provided access to the secure medical record. In FIG. 6A, user A 74 securely transmits 38, 44 and stores a medical record in its two portions 46 and 48 in computer system 50, as described above with reference to FIG. 2. User A has knowledge of key 35 that must be submitted to computer system 50 to retrieve the record. To provide user B 75 with access to the medical record, user A transfers the knowledge of the key 35 to user B at 76. This transfer can be made, for example, by a secure e-mail, using one of the well-known encryption methods for transferring data over the Internet (such as SSL 128-bit). Once user B 75 has knowledge of the key 35, user B can access the medical records by submitting the key at 77 and viewing the record at 78, as outlined in FIG. 5 and described above.

Figure 7A:
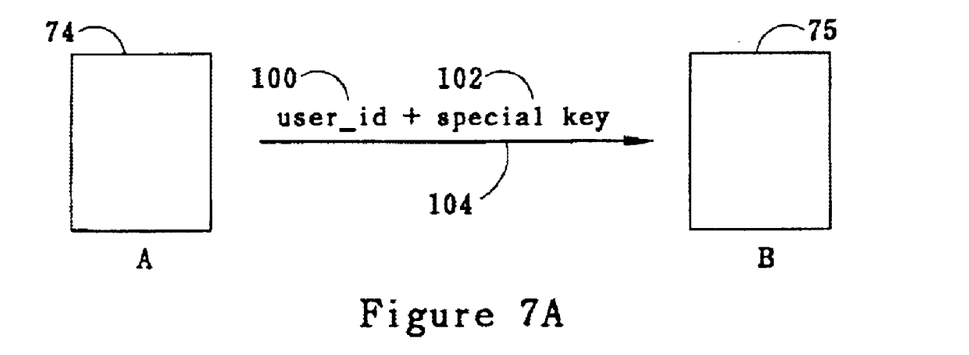
FIGS. 7A, 7B, 7C, and 7D illustrate graphically another method for providing additional users access to the secure medical records.
Figure 7B:
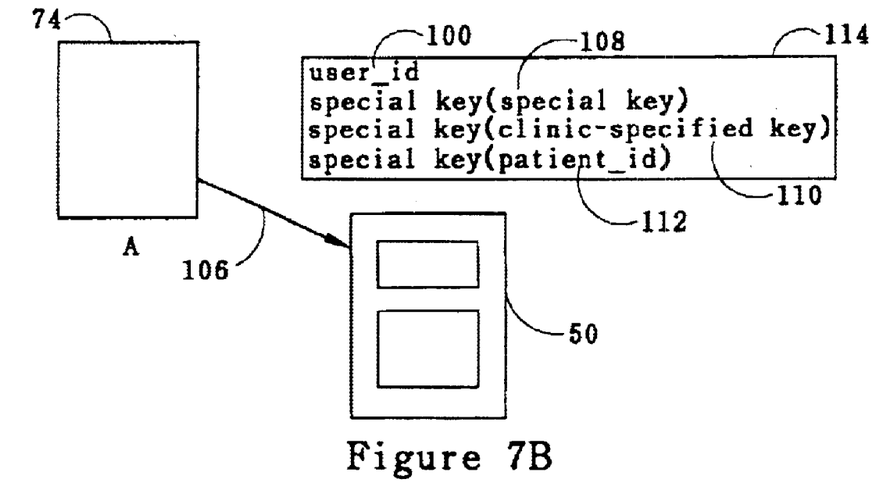

In another embodiment, FIGS. 7A, 7B, 7C, and 7D, a second physician is provided access to the secure medical record without being provided the clinic-specified key, to keep the clinic-specified key from becoming widely known. As shown in FIG. 7A, instead of transmitting the clinic-specified key to clinic B 75, clinic A 74 provides at 104 the second physician at clinic B with a user id 100 and special key 102. In FIG. 7B, Clinic A 74 also provides at 106 the remote computer system 50 with the user_id 100 and special key, except the special key is first used to encrypt itself so that what is transmitted to and stored in the remote computer system 50 is the user_id 100 and the special key encrypted special key 108. In the same file 114 as the user_id 100 and encrypted special key 108, clinic A 74 also transmits to the remote computer system 50 the encrypted clinic-specified key 110, which has been encrypted with the special key 102, and an encrypted patient_id 112, also encrypted with the special key 102. The patient_id is part of the identification code 23 and is the patient_id for the patient whose medical record clinic A 74 would like to provide clinic B 75 access to. File 114 is stored in the remote computer system 50.

Figure 7C:
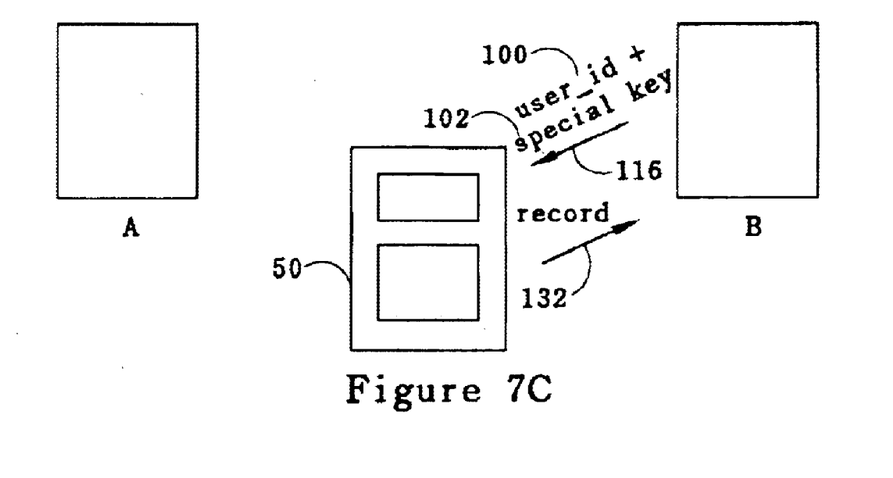
Figure 7D:
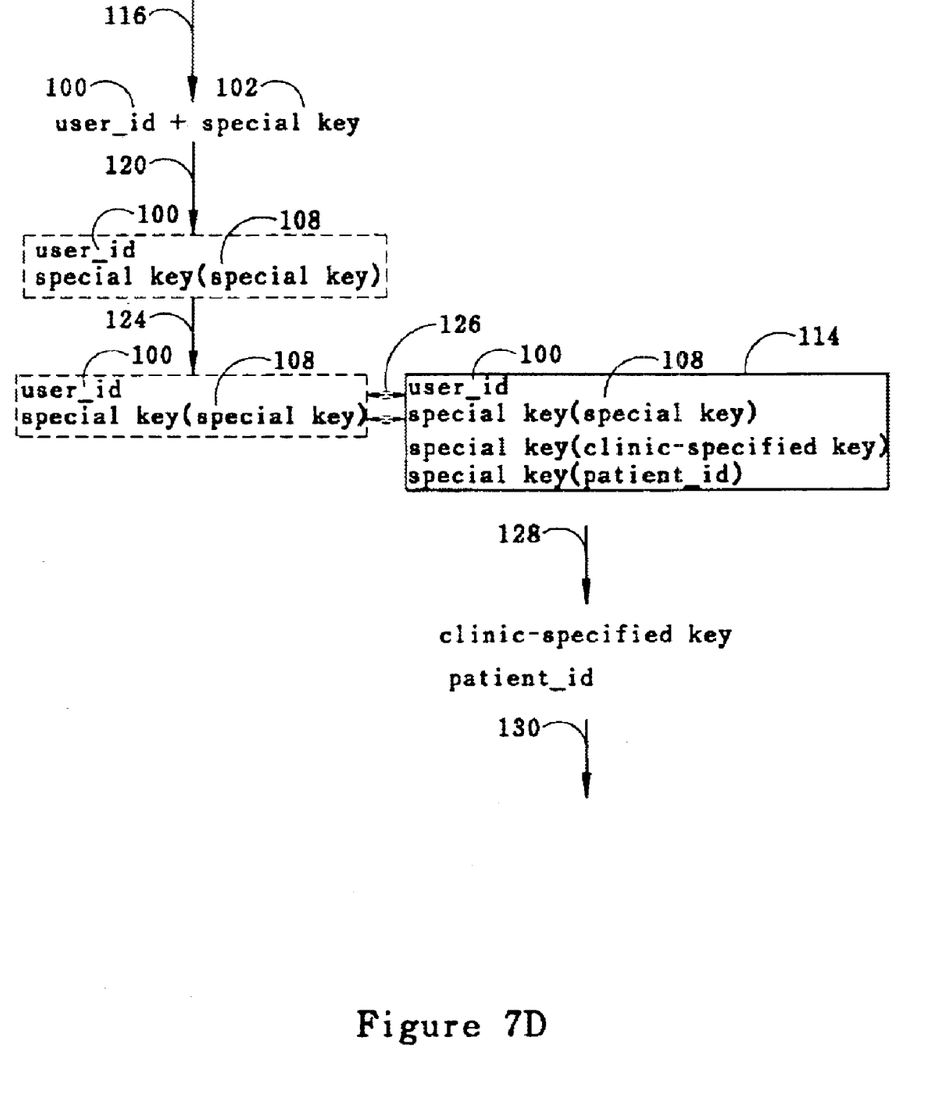

To access the patient medical record, FIG. 7C, clinic B 75 logs into the remote computer data system 50 as previously described using clinic B's login password. Clinic B submits at 116 the user_id 100 and special key 102. Once the user_id 100 and special key are received, FIG. 7D, a program executed by the remote computer data system 50 encrypts at 120 the special key 102 with the special key 102 to create a new copy of the encrypted special key 108. At 124, the remote computer system then checks to see if there is a file, 114, containing a user_id 100 and encrypted special key 108 that match the submitted user_id 100 and encrypted special key 108. If a match is found 126, the remote computer system uses the special key to decrypt at 128 the rest of the contents of file 114, specifically the clinic-specified key and the patient_id. The clinic-specified key is used to decrypt the personal data portion and the medical data portion corresponding to the patient_id is identified. The user is able to view the decrypted file. Again, once the user ends the session with the remote computer system 50, the decrypted personal data portion, the special key, and the decrypted clinic-specified key and patient_id are erased 130.

The special key is typically a symmetric key, such as that used for the clinic-specified key. As with the personal data portion of the medical records, an additional level of security can be added to file 114 by further encrypting the file. For example, file 114 can be further encrypted using the RSA encryption algorithm as described in reference to FIG. 3.

File 114 can contain multiple patient_ids if clinic A wants to provide clinic B with access to multiple patient records. Also, because the unencrypted medical data portion will contain, as part of the identification code 23, the patient_id, file 114 need not contain the clinic-specified key information if only the medical data portion is required. This is if clinic B already knows the necessary personal data of the patient whose medical records are being requested. In this way, patients can also be given access to their own medical record.

It should be noted that the clinic-specified key can be used to encrypt varying numbers of personal data portions of medical records. For instance, one key can be used to encrypt all medical records generated at the clinic. This has the advantage of simplicity, as only one key needs to be remembered to access any record from the clinic. But it also provides less security if the key is to be used by those outside of the clinic, because once the key is known all the medical records from the clinic can be accessed. Typically, if only one clinic specified key has been used, access is provided to other clinics using the embodiment described with reference to FIGS. 7A–7D. At the other extreme, a separate key may be used for each individual patient's record. While this creates a large number of keys, it allows for each patient to be able to access their own medical record directly, and without potentially compromising the confidentiality of any other patient's medical record. In this case, a secure computerized key management system, as would be known to those of skill in the art, is employed to manage the large number of keys.

It should also be noted that a medical record for use with the method is any file that can be partitioned into a personal data portion and a medical data portion. For example, a referral letter referring a patient to a new physician will typically include personal data to identify the patient and medical data relating the patient's condition to the new physicians. A referral letter is, therefore, a medical record that can be secured by the present method. Likewise, a test result, for instance a digitized image from an X-ray or an MRI, will also have information to identify the patient and can be securely transmitted and stored using the present method. Medical insurance records can similarly be partitioned and therefore secured using the present method.

An important advantage of the embodiments of the invention is the database of anonymous medical data stored in the computer system. Such an electronic database can be used by researchers to gather a variety of useful information. For example, the information in the database could be used to easily answer questions such as what is the age or sex group that has the highest risk rate for having heart problems?

What is the state in the U.S. that has the highest rate of heart problems? Or what is the breakdown, by age (or sex or geographic location), of people taking a certain new drug?

The medical data can be even more useful if some of the patient personal data, though not enough to identify the patient, is preserved with the medical data. For instance, in one embodiment, the patient's age is categorized into an age range, and the age range is saved with the medical data In another embodiment, a portion of the patient's address, for instance the postal code (or city and state), is saved with the medical data to provide researchers using the database information on geographic location of patients. Again, because the researchers using the medical data do not have the clinic-specified keys, they are not able to identify any of the encrypted patient personal data.

As noted above, the present method differs from usual cryptography practice where the body of the message is encrypted and message identification information may be sent in plain text. Here the bulk of the message is not encrypted (or encrypted using a less secure but faster encryption method), and the patient identification information is highly encrypted. This method is relatively fast while still providing patient confidentiality and can allow patients and physicians to easily and quickly access medical records.

This description is illustrative and not limiting; further modifications will be apparent to one skilled in the art in light of this disclosure and are intended to fall within the scope of the appended claims.

What is claimed is:

1. A method, comprising:

receiving first and second files from a clinic via a network, the first file comprising an encrypted version of a personal data portion of a medical record of a subject, the personal data portion being encrypted using a clinic specified key, the second file comprising a medical data portion of the medical record of the subject, the personal and medical data portions each including an identifier associated with the medical record;

receiving a third file from the clinic via the network, the third file including encrypted versions of the clinic specified key, the identifier, and a special key, the encrypted versions of the clinic specified key, the identifier, and the special key being encrypted using the special key;

receiving a copy of the special key from a third party via the network;

encrypting the copy of the special key received from the third party using the special key;

comparing the encrypted copy of the special key received from the third party with the encrypted special key contained in the third file;

if the encrypted copy of the special key received from the third party matches the encrypted special key contained in the third file, decrypting the clinic specified key and identifier stored in the third file using the copy of the special key received from the third party;

decrypting the encrypted personal data portion of the first file using the clinic specified key decrypted from the first file;

retrieving the medical data portion from the second file using the identifier decrypted from the first file; and transmitting the decrypted personal data portion and the retrieved medical data portion to the third party via the network.

2. The method of claim 1, wherein the first and second files are sent in separate transmissions from the clinic to the data storage system.

3. The method of claim 1, wherein the identifier includes a subject identifier that identifies the subject and a clinic identifier that identifies the clinic.

4. The method of claim 1, wherein the first file is further encrypted using an asymmetric public key, the further encrypted first file being decrypted with an asymmetric private key associated with the asymmetric public key after the first file is received from the clinic.

5. The method of claim 1, wherein the first and second files are stored in separate databases.

6. The method of claim 1, wherein the copy of the special key and user identifier are provided to the third party by the clinic via the network.

7. A method for implementing a medical record security system, comprising:

receiving first and second files from a clinic via a network, the first and second files being sent in separate transmissions from the clinic to the data storage system, the first file comprising an encrypted version of a personal data portion of a medical record of a subject, the personal data portion being encrypted using a clinic specified symmetric key and a symmetric key encryption algorithm, the second file comprising a medical data portion of the medical record of the subject, the personal and medical data portions each including an identifier associated with the medical record, the identifier including a subject identifier that identifies the subject and a clinic identifier that identifies the clinic, the first file being further encrypted using an asymmetric public key, the further encrypted first file being decrypted with an asymmetric private key associated with the asymmetric public key after the first file is received from the clinic;

storing the first and second files, the first and second files being stored in separate databases;

receiving a third file from the clinic via the network, the third file including a user identifier and encrypted versions of the clinic specified symmetric key, the identifier (or the subject identifier), and a special key, the encrypted versions of the clinic specified symmetric key, the identifier (or the subject identifier), and the special key being encrypted using the special key;

storing the third file;

receiving a copy of the user identifier and the special key from a third party via the network, the copy of the user identifier and the special key and user identifier being provided to the third party by the clinic via the network;

encrypting the copy of the special key received from the third party using the special key;

comparing the user identifier and the encrypted copy of the special key received from the third party with the user identifier and the encrypted special key contained in the third file;

if the user identifier and the encrypted copy of the special key received from the third party matches the user identifier and the encrypted special key contained in the third file, decrypting the clinic specified key and identifier stored in the third file using the copy of the special key received from the third party;

decrypting the encrypted personal data portion of the first file using the clinic specified key decrypted from the first file;

retrieving the medical data portion from the second file using the identifier decrypted from the first file; and transmitting the decrypted personal data portion and the retrieved medical data portion to the third party via the network.

* * * * *